US012649416B2

(12) United States Patent
Kondrad et al.

(10) Patent No.: US 12,649,416 B2
(45) Date of Patent: Jun. 9, 2026

(54) VEHICLE USER SUPPORT INCLUDING FLEXIBLE LIGHTING FEATURES

(71) Applicant: Ford Global Technologies, LLC, Dearborn, MI (US)

(72) Inventors: Marc Silva Kondrad, Macomb Township, MI (US); Kevin Wayne Preuss, Ortonville, MI (US); David D. Friske, Wolverine Lake, MI (US); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 18/541,851

(22) Filed: Dec. 15, 2023

(65) Prior Publication Data

US 2025/0196766 A1 Jun. 19, 2025

(51) Int. Cl.
| | |
|---|---|
| *B60Q 3/233* | (2017.01) |
| *B60N 2/58* | (2006.01) |
| *B60Q 3/78* | (2017.01) |
| *F21S 4/24* | (2016.01) |

(52) U.S. Cl.
CPC .............. *B60Q 3/233* (2017.02); *B60N 2/58* (2013.01); *B60Q 3/78* (2017.02); *F21S 4/24* (2016.01)

(58) Field of Classification Search
CPC . B60Q 3/00; B60Q 3/233; B60Q 3/78; B60N 2/58; F21S 4/00; F21S 4/24; F21S 4/26; F21S 4/28
See application file for complete search history.

(56) References Cited

U.S. PATENT DOCUMENTS

| | | | |
|---|---|---|---|
| 6,854,869 B1 | 2/2005 | Fernandez | |
| 7,201,444 B2 | 4/2007 | Schimmoller | |
| RE42,340 E | 5/2011 | Anderson | |
| 9,694,741 B2 | 7/2017 | Salter et al. | |
| 9,802,535 B2 | 10/2017 | Line et al. | |
| 10,035,442 B2 | 7/2018 | Kondrad et al. | |
| 10,086,752 B1 * | 10/2018 | Bobo | B60Q 3/80 |
| 10,143,043 B1 | 11/2018 | Elson et al. | |
| 10,259,386 B2 * | 4/2019 | Unger | B60Q 3/78 |
| 10,279,646 B2 | 5/2019 | Arens et al. | |
| 10,457,175 B2 | 10/2019 | Lang et al. | |
| 10,637,007 B1 | 4/2020 | Wang | |
| 10,910,592 B2 | 2/2021 | Kuon et al. | |
| 10,953,775 B1 | 3/2021 | Maloney et al. | |
| 11,279,274 B1 | 3/2022 | Selvasekar et al. | |
| 11,280,303 B2 | 3/2022 | Christensen et al. | |

(Continued)

OTHER PUBLICATIONS

End Motive, "How to make 3D printed car parts-Custom truck emblems," website https://www.youtube.com/watch?v= hfs6XpP6JvE, Jan. 12, 2022, 2 pages.

(Continued)

*Primary Examiner* — Chi Q Nguyen
(74) *Attorney, Agent, or Firm* — Vichit Chea; Price Heneveld LLP

(57) ABSTRACT

A user support for motor vehicles includes a flexible cover having a flexible light comprising electroluminescent material that emits light when electrical power is supplied to the electroluminescent material. The user support may include a resilient porous lattice matrix formed by an additive process and may include electroluminescent material disposed on links of the lattice matrix.

19 Claims, 15 Drawing Sheets

(56) References Cited

U.S. PATENT DOCUMENTS

| | | | |
|---|---|---|---|
| 11,292,375 B1 | 4/2022 | Nageshkar et al. | |
| 11,299,079 B1 | 4/2022 | Skrbis et al. | |
| 11,533,793 B2 | 12/2022 | Rogers et al. | |
| 11,536,429 B1* | 12/2022 | Cheng | B60Q 3/80 |
| 11,633,045 B2* | 4/2023 | Mao | A47C 7/725 |
| | | | 362/131 |
| 11,665,830 B2 | 5/2023 | Ali et al. | |
| 11,680,180 B2 | 6/2023 | Gwengo et al. | |
| 11,780,355 B1 | 10/2023 | Romelfanger et al. | |
| 11,903,492 B2* | 2/2024 | Mao | F21S 4/28 |
| 12,311,840 B2* | 5/2025 | Gorfer | G02B 6/001 |
| 2007/0001124 A1 | 1/2007 | Moreno Sobrino et al. | |
| 2014/0021754 A1* | 1/2014 | Jung | B60Q 3/233 |
| | | | 297/217.6 |
| 2015/0251596 A1* | 9/2015 | Salter | F21V 9/32 |
| | | | 362/510 |
| 2018/0043805 A1 | 2/2018 | Baek et al. | |
| 2018/0361941 A1 | 12/2018 | Mozurkewich et al. | |
| 2019/0001877 A1* | 1/2019 | Unger | B60N 2/58 |
| 2019/0001879 A1* | 1/2019 | Ali | H05K 3/285 |
| 2019/0077310 A1* | 3/2019 | Scott | H05K 1/0283 |
| 2019/0092196 A1 | 3/2019 | Prozzi et al. | |
| 2019/0287910 A1 | 9/2019 | Keating et al. | |
| 2019/0298072 A1 | 10/2019 | Bhatia et al. | |
| 2020/0231285 A1 | 7/2020 | Udriste et al. | |
| 2020/0343770 A1 | 10/2020 | Baker et al. | |
| 2021/0101510 A1 | 4/2021 | Kondrad et al. | |
| 2022/0055751 A1 | 2/2022 | Hansson et al. | |
| 2023/0045310 A1* | 2/2023 | Matsumura | B60Q 3/78 |
| 2023/0099347 A1* | 3/2023 | Matsumura | B60Q 3/62 |
| | | | 362/488 |

OTHER PUBLICATIONS

Eric Strebel, "How to 3D Print Motorhead vehicle emblem bade for your car: prime sand and paint!," Website, https://www.youtube.com/watch?v=nOOFaH6Y46Y, Jun. 14, 2017, 1 page.

Hemmings, "How to Create a Custom 3D Printed Car Badge," website https://www.youtube.com/watch?v=vnOx9PzBZu8, Aug. 31, 202, 2 pages.

Kordare, "Designing and 3D Printing Custom Badges for my Car," website https://www.youtube.com/watch?v =_HYdTvx1dgQ, Jul. 24, 2020, 1 page.

* cited by examiner

VEHICLE USER SUPPORT INCLUDING FLEXIBLE LIGHTING FEATURES

FIELD OF THE DISCLOSURE

The present disclosure generally relates to a user support assembly for vehicles, and more particularly to a user support assembly having lighting features that may be flexible.

BACKGROUND OF THE DISCLOSURE

Various types of user supports have been developed to support operators and/or passengers of motor vehicles.

SUMMARY OF THE DISCLOSURE

An aspect of the present disclosure is a user support (seat) for motor vehicles. The user support may include a lower portion having an upwardly-facing cushioned user support surface, and a back portion having a forwardly-facing user support surface. A flexible cover extends over at least a portion of a selected one of the lower portion and the back portion. The user support further includes electrical conductors disposed on an inner side of the flexible cover. The flexible cover includes a flexible light extending along a portion of the flexible cover. The flexible light includes flexible electroluminescent material that is electrically connected to the electrical conductors whereby the flexible electroluminescent material emits light when electrical power is supplied to the flexible electroluminescent material by the electrical conductors.

The flexible light may include a strip of flexible opaque material, wherein at least a portion of the strip of flexible opaque material is disposed on an inner side of the flexible electroluminescent material.

The strip of flexible opaque material may be wider than the electroluminescent material, and opposite edge portions of the strip of flexible opaque material may wrap around opposite edges of the flexible electroluminescent material, whereby the opposite edge portions of the strip of flexible opaque material are disposed on an outer side of the flexible electroluminescent material, and a central portion of the strip of flexible opaque material is disposed on an inner side of the flexible electroluminescent material.

The user support may include stitches going through the opposite edge portions of the strip of flexible opaque material and through the flexible electroluminescent material to thereby interconnect the flexible electroluminescent material and the opposite edge portions of the strip of flexible opaque material.

The flexible cover may comprise flexible opaque material having an elongated opening therethrough with spaced apart edges extending along opposite sides of the elongated opening.

The strip of flexible opaque material may be connected to the flexible opaque material of the flexible cover by stitches extending through the strip of flexible opaque material and through the flexible opaque material of the flexible cover adjacent to the spaced apart edges of the flexible opaque material of the flexible cover.

The electrical conductors disposed on an inner side of the flexible cover may comprise metal printed on an inner side of the flexible cover.

The user support may include a cushion comprising a resilient porous lattice matrix formed by an additive process, wherein the resilient porous lattice matrix has a plurality of links that are interconnected to form a one-piece polymer structure.

At least a selected one of the links may include an electroluminescent material that emits light when electrical power is supplied to the electroluminescent material.

At least one link of the resilient porous lattice matrix may comprise an elongated polymer core that is coated with an electroluminescent material.

All of the links of the resilient porous lattice matrix may optionally be coated with an electroluminescent material.

The user support may include at least one LED secured to a link of the resilient porous lattice matrix.

The cushion may have a resilient front surface that is configured to support a user, and a rear surface comprising a layer of material that is integrally formed with the resilient porous lattice matrix, wherein the layer of material includes an opening therethrough. An LED may be aligned with the opening whereby light being emitted by the LED passes through the opening and into the resilient porous lattice matrix.

Another aspect of the present disclosure is a user support for motor vehicles. The user support includes a frame and a cushion comprising a resilient porous lattice matrix formed by an additive process, wherein the resilient porous lattice matrix has a plurality of links that are interconnected to form a one-piece polymer structure. At least a selected one of the links may include an electroluminescent material that emits light when electrical power is applied to the electroluminescent material.

At least one link of the resilient porous lattice matrix may comprise an elongated polymer core that is coated with an electroluminescent material.

All of the links of the resilient porous lattice matrix may be coated with an electroluminescent material.

At least one LED may be secured to a link of the resilient porous lattice matrix.

Another aspect of the present disclosure is a user support for motor vehicles. The user support includes a frame and a cushion comprising a resilient porous lattice matrix formed by an additive process, wherein the resilient porous lattice matrix has a plurality of links that are interconnected to form a one-piece polymer structure. The user support includes at least one LED that is secured to a link of the resilient porous lattice matrix.

The user support may include a plurality of LEDs secured to the resilient porous lattice matrix.

At least a selected one of the links may include an electroluminescent material that emits light when electrical power is supplied to the electroluminescent material.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
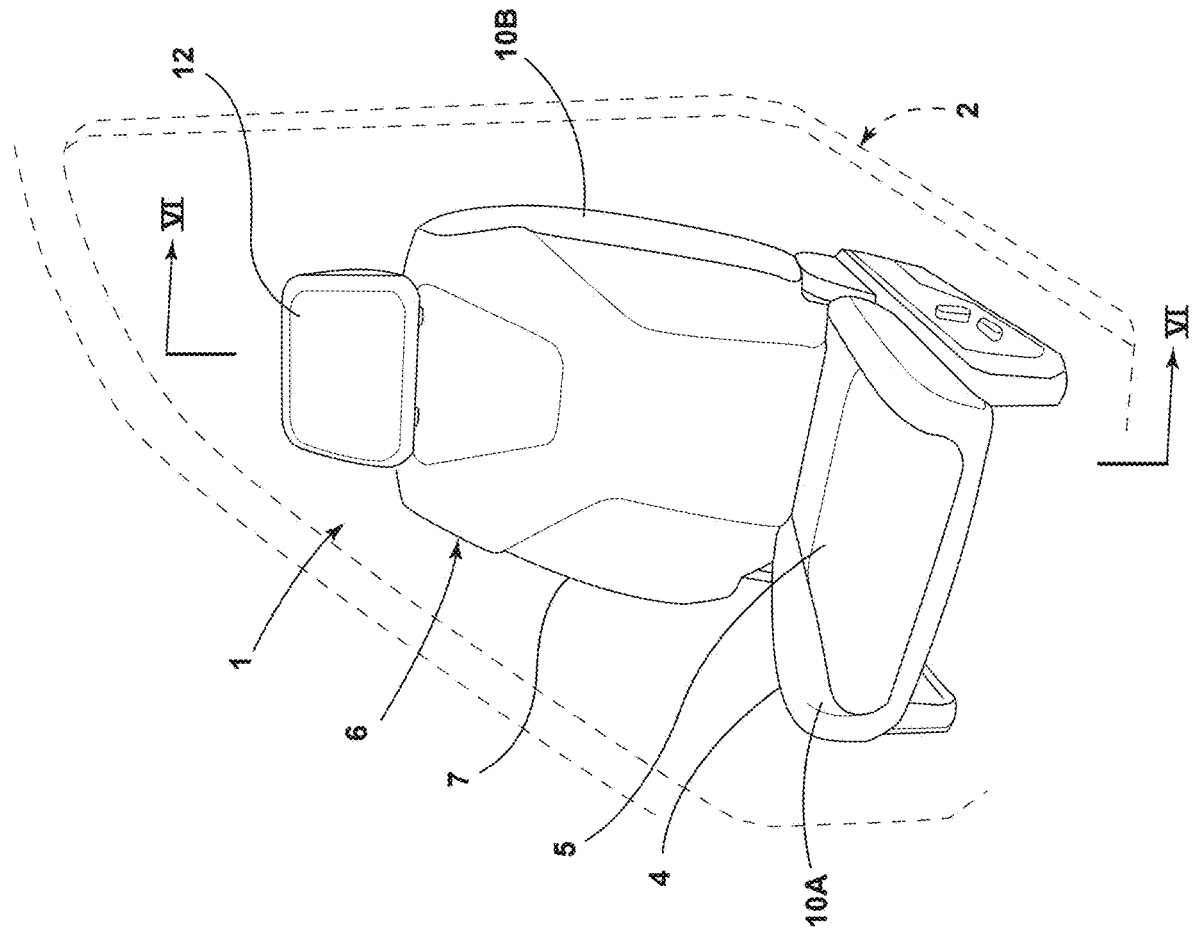
FIG. 1 is a perspective view of a user support according to an aspect of the present disclosure.

The present application is related to U.S. patent application Ser. No. 18/541,404, entitled "VEHICLE USER SUPPORT INCLUDING UPPER HOOD MODULE", filed on Dec. 15, 2023, and U.S. patent application Ser. No. 18/541, 739, entitled "USER SUPPORT ASSEMBLY FOR VEHICLES", filed on Dec. 15, 2023, the entire contents of each are hereby incorporated herein by reference.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

The present illustrated embodiments reside primarily in combinations of method steps and apparatus components related to a user support. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
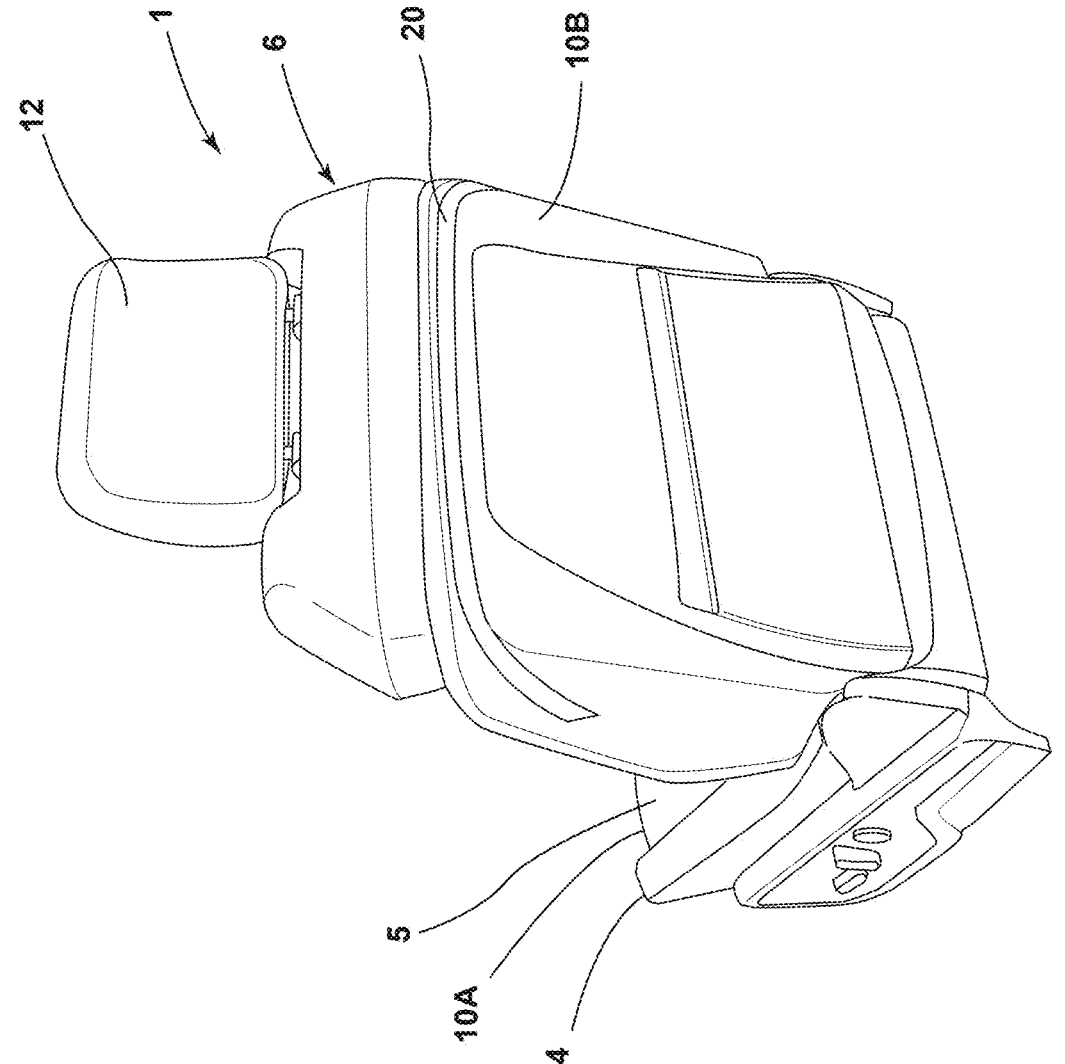
FIG. 2 is a perspective view of the user support of FIG. 1.
Figure 3:
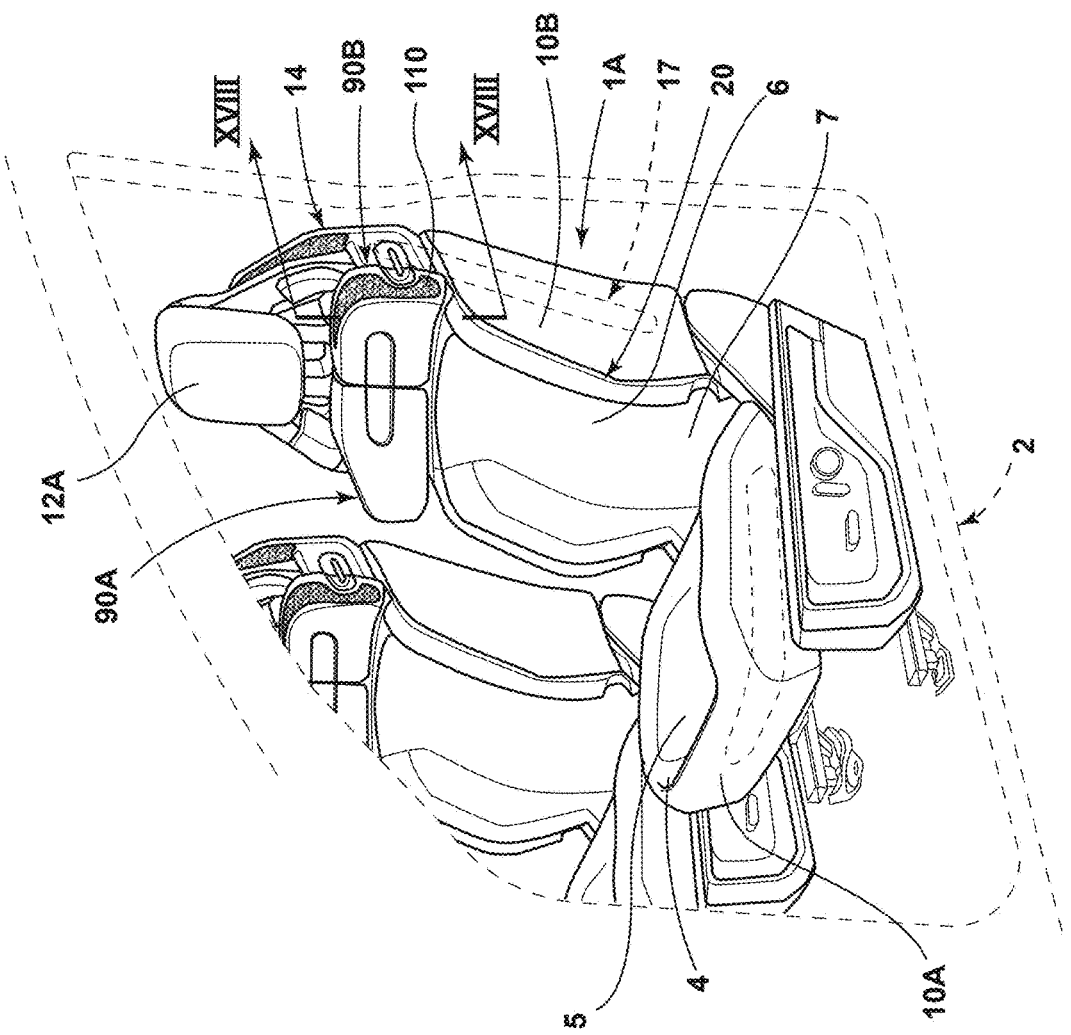
FIG. 3 is a perspective view of a user support according to another aspect of the present disclosure.
Figure 4:
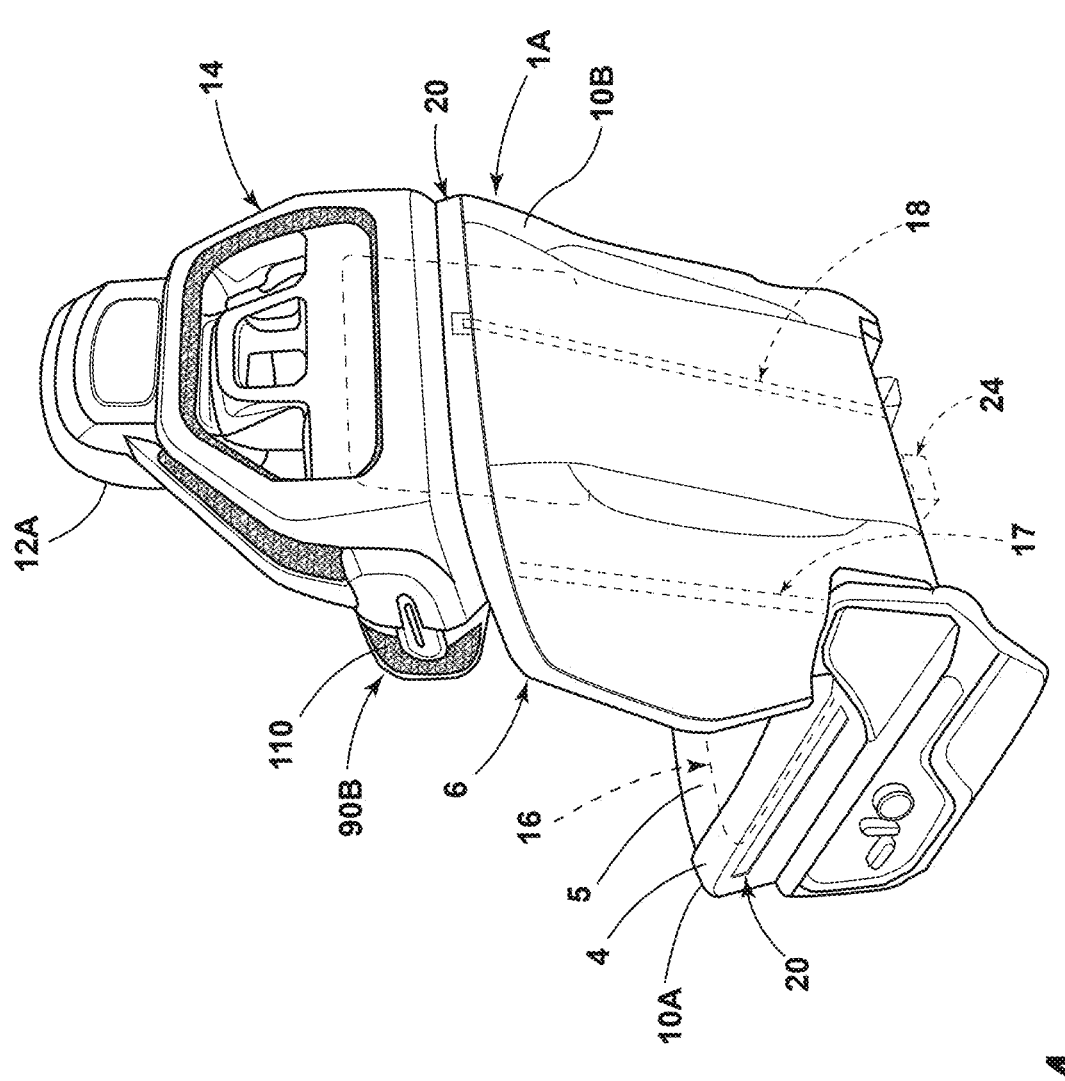
FIG. 4 is an isometric view of the user support of FIG. 3.
Figure 5:
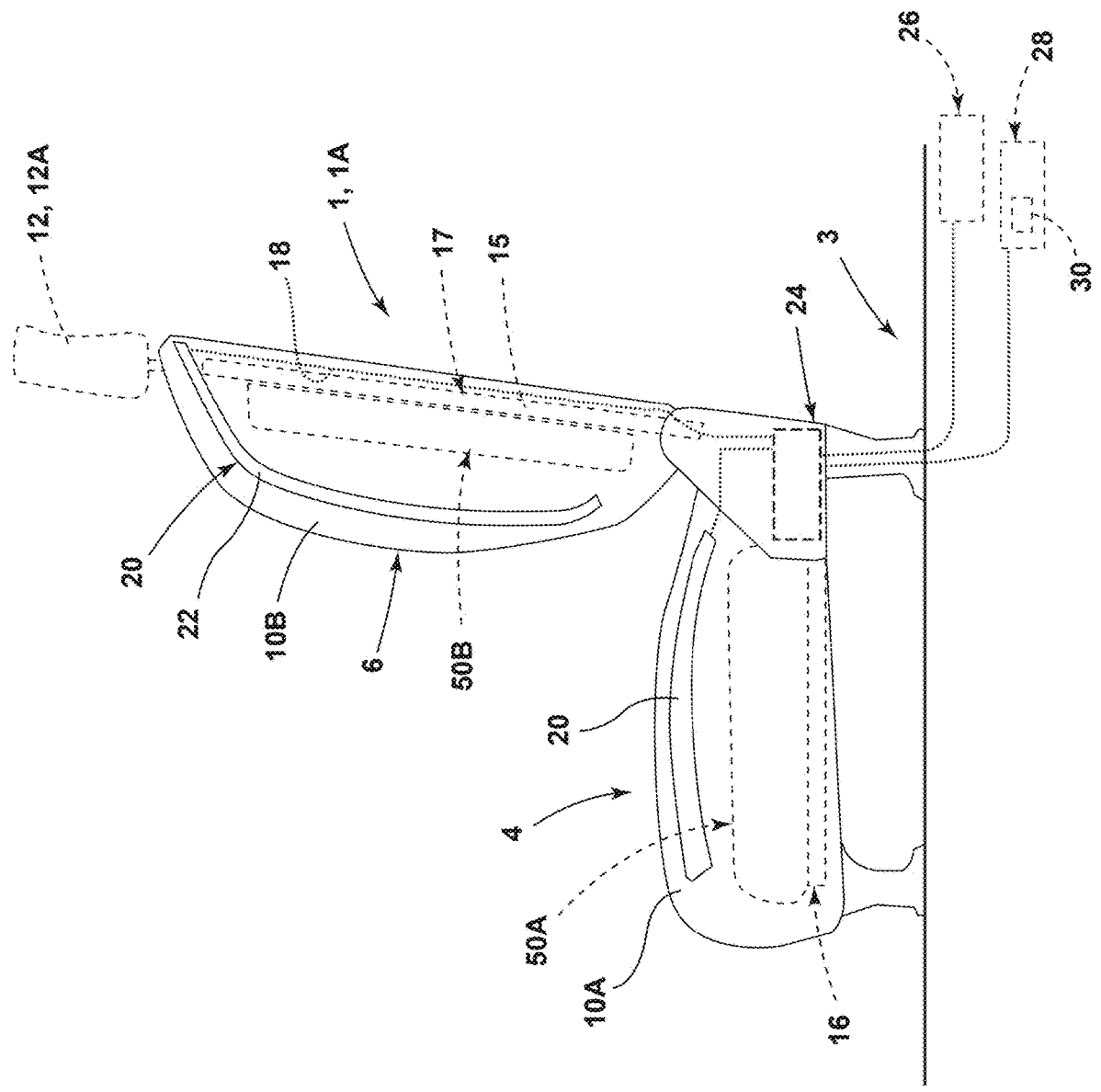
FIG. 5 is a schematic, partially fragmentary, side elevational view of a user support.

User supports 1 (FIGS. 1 and 2) and user supports 1A (FIGS. 3 and 4) are generally configured to support users in a motor vehicle 2 or the like. The user supports 1 and 1A include a lower portion 4 and a back portion 6. Lower portions 4 have an upwardly-facing cushion user support surface 5, and the back portion 6 has a forwardly-facing user support surface 7. User supports 1, 1A may be configured to be secured to a floor 3 of vehicle 2 (FIG. 5). A flexible cover 10 (e.g. covers 10A, 10B) extends over at least a portion of a selected one of the lower portion 4 and the back portion 6. In the illustrated example, separate covers 10A and 10B are utilized on the lower portion 4 and back portion 6, respectively. However, it will be understood that a single cover may extend over lower portion 4 and back portion 6, or a user support 1, 1A may utilize a cover 10A or 10B on only one of the lower portion 4 and back portion 6. The flexible covers 10A and 10B may comprise leather, vinyl, fabric, or other suitable material.

The user support 1 (FIGS. 1 and 2) may include an upper support 12 that is connected to back portion 6. The user support 1A (FIGS. 3 and 4) may include an upper module 14 that includes an upper support 12A. User support 1A may include upper cushions 90A and 90B. The cushions 90A and 90B may be mirror images of one another. It will be understood that the user supports 1 and 1A of FIGS. 1-5 are merely examples of user supports, and the present disclosure is not limited to the specific configurations of FIGS. 1-5.

The flexible covers 10 (e.g. covers 10A, 10B) may include a light 20 (see also FIG. 5) extending along a portion of the flexible cover 10A, 10B. The light 20 includes a flexible

Figures 6, 7:
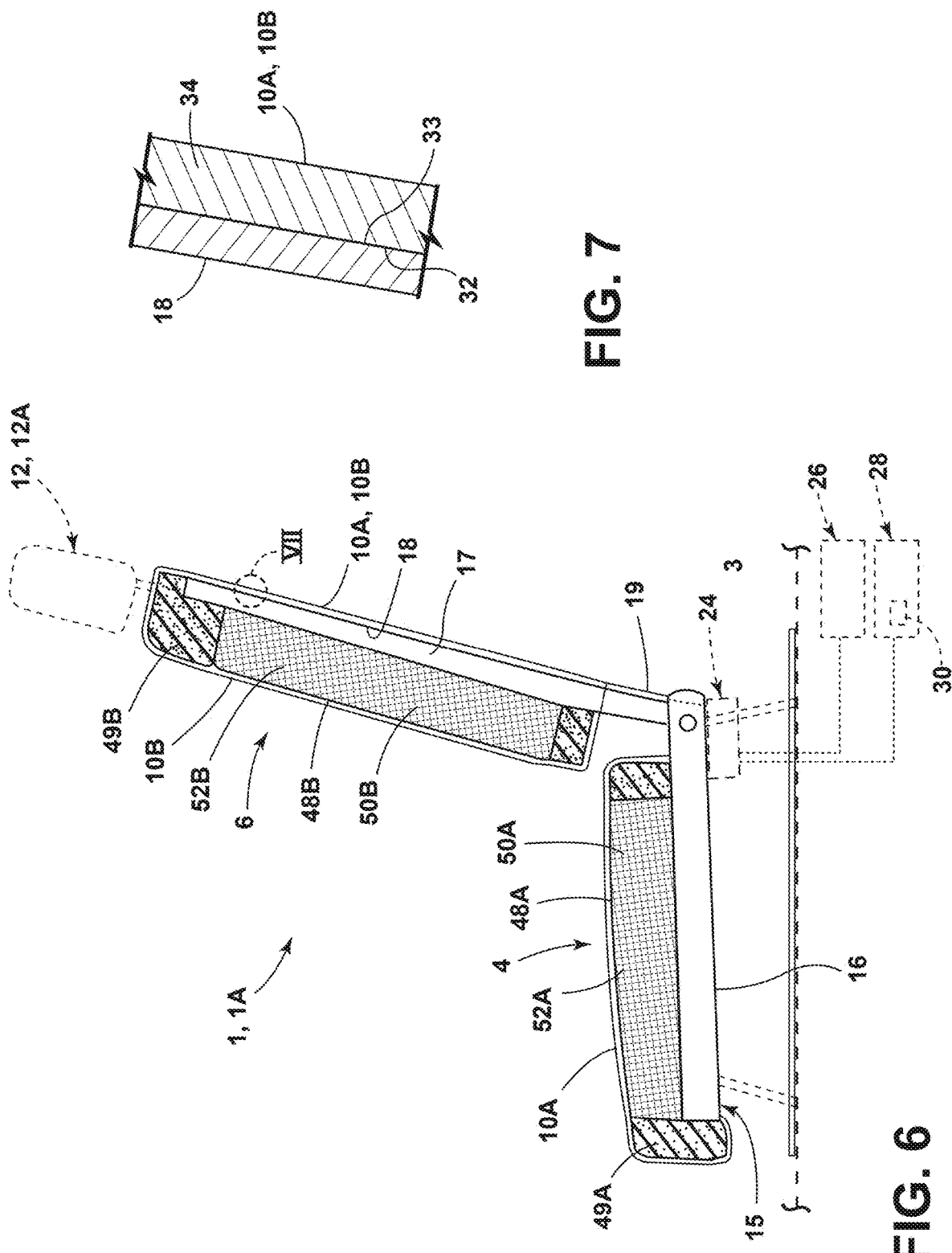
FIG. 6 is a schematic cross-sectional view of the user support of FIG. 1 taken along the line VI-VI.
FIG. 7 is an enlarged cross-sectional view of a portion of the user support of FIG. 6.
Figures 8, 9:
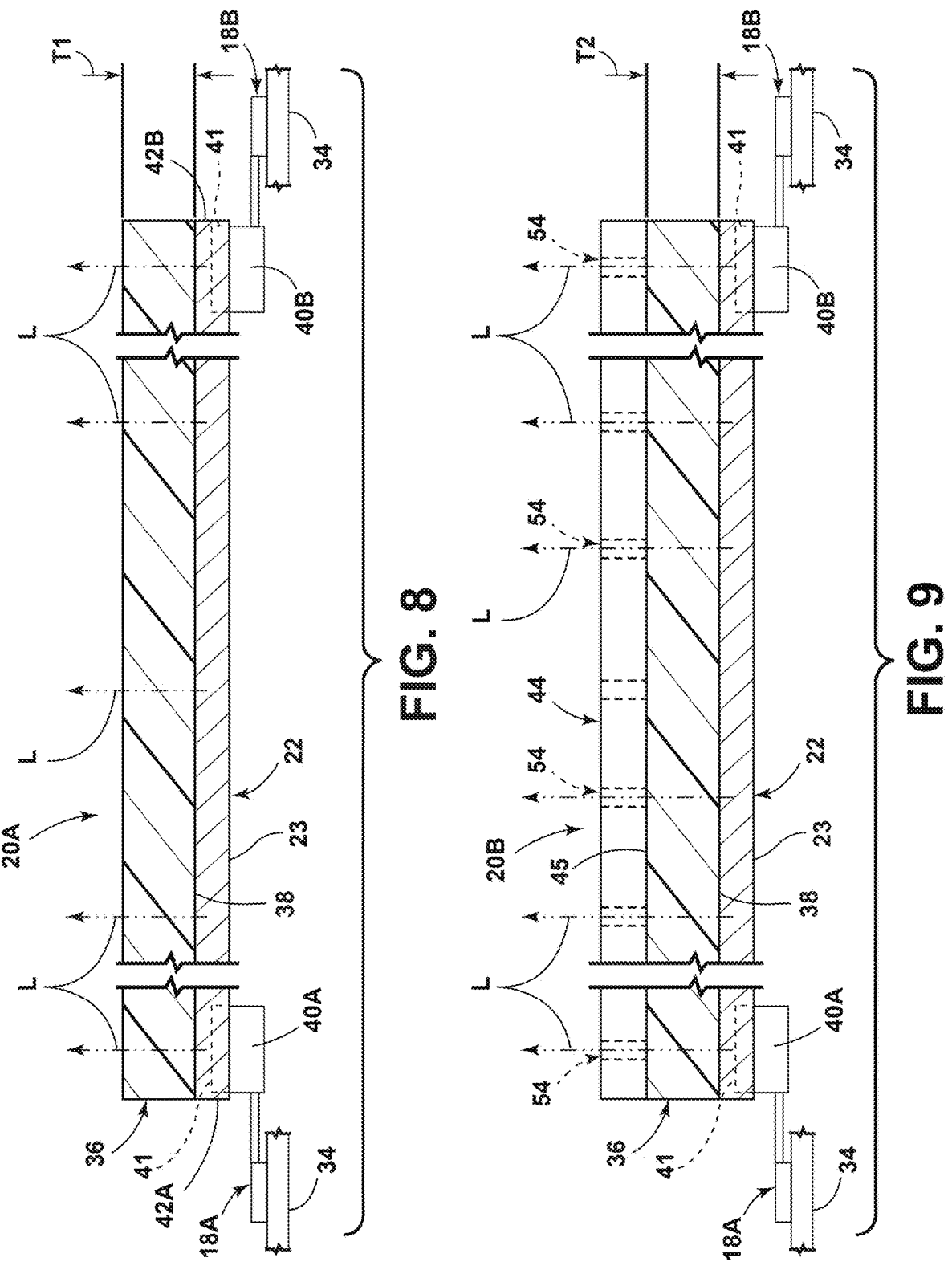
FIG. 8 is a fragmentary cross-sectional view of a light according to an aspect of the present disclosure.
FIG. 9 is a fragmentary cross-sectional view of a light according to another aspect of the present disclosure.

6 electroluminescent material, such as light strip 22 (see also FIGS. 8 and 9). Although material 22 is referred to herein as a "light strip," it will be understood that material 22 may have virtually any size and shape as required for a particular application, and the present disclosure is not limited to a strip or other specific configuration. The light strip 22 may comprise a phosphor layer in combination with one or more other layers of material. Electroluminescent material may comprise a commercially available LUMILOR® material having several "paint" layers that are applied in a known sequence/process. As discussed in more detail below, the electroluminescent material of light strip 22 emits light when electrical power is supplied to the light strip 22. The light strip 22 is electrically connected to electrical conductors 18 (see also FIGS. 6 and 7), whereby the electroluminescent material of light strip 22 emits light when electrical power from an electrical power source 24 is supplied to the light strip 22 by electrical conductors 18. The electrical power source 24 (FIGS. 5 and 6) may comprise a battery or electrical circuitry that is operably connected to a main vehicle power supply 26 in a vehicle control system 28. In general, the vehicle control system 28 may comprise numerous sensors, modules, and networks. The vehicle control system 28 may include one or more user inputs 30. The user inputs may comprise, for example, switches, a touchscreen on a vehicle-board, or other input features that allow a user to control when electrical power is supplied to the light strip 22. The vehicle control system 28 may be configured to provide for illumination of the light strip 22 when, for example, the vehicle interior and/or exterior lights are illuminated, a vehicle door opens, a low level of light inside or outside the vehicle is detected by sensors of control system 28, etc.

Referring again to FIGS. 6 and 7, conductors 18 may comprise conductive material that is deposited (e.g., printed) on an inner surface 32 of a layer of material 34 of cover 10A or 10B. Layer 34 may comprise fabric, vinyl, leather, or a combination of layers of such materials. The conductor material 18 that is deposited on layer 32 may comprise a Liquid X® conductive metal that is availed from Liquid X® Printed Metals, Inc. of Pennsylvania. A portion 19 of conductors 18 may optionally comprise wires that electrically interconnect the light strip 22 to the power source 24.

Figure 28:
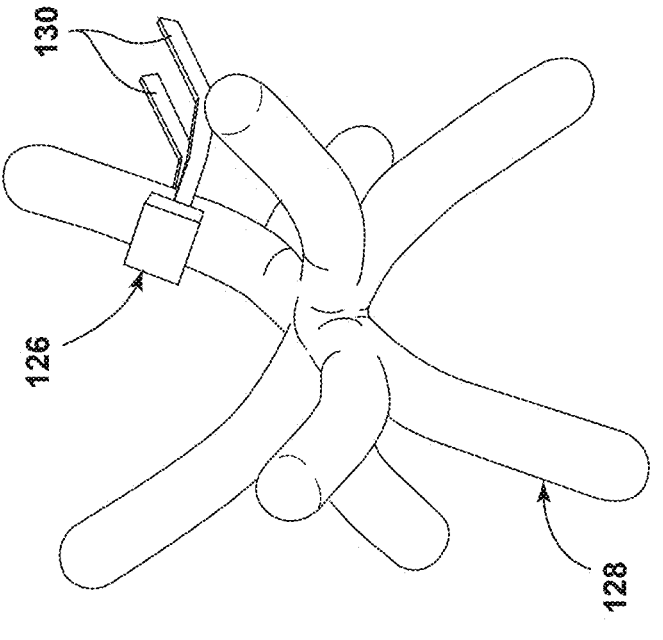
FIG. 28 is a partially schematic perspective view of a single lattice element showing an LED attached thereto.

Support structures 1, 1A (FIG. 6) may include a frame 15 having a lower portion 16 and an upper portion 17. The user supports may also include resilient supports 50A and 50B comprising resilient porous lattice matrix structures 48A and 48B, respectively. The porous lattice matrix structures 48A and 48B may comprise polymer structures formed utilizing an additive process (e.g. 3D printing) as described in more detail in co-pending U.S. patent application Ser. No. 18/541, 404, now U.S. Pat. No. 12,594,866 B2, entitled "VEHICLE USER SUPPORT INCLUDING UPPER HOOD MODULE", filed on Dec. 15, 2023, and U.S. patent application Ser. No. 18/541,739, entitled "USER SUPPORT ASSEMBLY FOR VEHICLES", filed on Dec. 15, 2023, incorporated herein by reference above. The user support 1 may optionally include foam 49A and 49B. Also, the covers 10A and 10B may, optionally, not extend over front surfaces 52A and 52B, respectively, of lattice structures 48A, 48B, such that the front surfaces 52A, 52B may be at least partially exposed. As discussed below in connection with FIGS. 19-27, one or both lattice structures 48A, 48B may include one or more LED light sources 126 (FIGS. 5, 28, 29) and/or an electroluminescent material 118 (FIG. 27) that emits light. The light emitted from the LEDs 126 and/or electroluminescent material may be emitted from one or both surfaces 52A, 52B of lattice structures 48A, 48B, respectively.

Light 20 may have various constructions, such as light 20A of FIG. 8, or light 20B of FIG. 9. Light 20A (FIG. 8) includes a layer of thermoplastic polyolefin (TPO) 36 that is bonded to the light strip 22. The materials of light strip 22 may be sprayed onto surface 38 of TPO 36. Alternatively, the light strip 22 may be pre-fabricated and adhered to surface 38 of TPO 36 utilizing adhesive, heat pressing, or other suitable process. The light strip 22 includes elongated electrical conductors such as electrical buses 40A and 40B that extend along the light strip 22 adjacent to the opposite side edges 42A and 42B, respectively, thereof. The buses 40A and 40B of the light strip 22 may be electrically coupled to first and second conductive lines 18A and 18B disposed on layer 34 of cover 10A, 10B. The conductors 18A and 18B may comprise positive and negative alternating current ("AC") inputs to the light strip 22. In FIG. 8, the buses 40A and 40B are shown projecting from a surface 23 of the light strip 22, however, it will be understand that the buses 40A and 40B may be flush with surface 23 as shown by the dash lines 41.

In further reference to FIG. 9, light 20A includes a light strip 22 that is operatively connected to conductors 18A and 18B in substantially the same manner as described above in FIG. 8. The light 20B also includes a TPO layer 36. Light 20B further includes a layer of fabric 44 that is disposed on surface 45 of TPO layer 36. Fabric 44 may be adhesively bonded, heat sealed, or otherwise secured to surface 45 of TPO layer 36. Preferably, the light strip 22 comprises a multi-layer structure that is sprayed onto surface 38 of layer 36. For example, the light strip 22 may be formed utilizing LUMILOR® paints applied in sequence according to known processes.

The TPO layer 36 of light 20A of FIG. 8 has a thickness "T1," whereas the TPO layer 36 of light 20B of FIG. 9 has a thickness "T2." In general, the thickness T1 may (optionally) be greater than the thickness T2. For example, the thickness T1 may be about 0.020-0.060 inches, whereas the thickness T2 may be, for example, 0.010-0.030 inches. It will be understood that these ranges are merely examples, and the actual thicknesses T1 and T2 may vary depending on the composition of the TPO layer 36, the contours of the cover, and/or other factors. For example, the fabric layer 44 may reduce the flexibility of the light 20D, such that a somewhat thinner TPO layer 36 may be utilized to provide sufficient flexibility to permit the light 20D to fit around various curves of the cover 10A or 10B. Also, it will be understood that the layer 36 could comprise other suitable materials, and the present disclosure is not limited to TPO or any other specific material.

Referring again to FIG. 9, the layer 45 may optionally include a plurality of perforations 54 that permit light "L" emitted by the light strip 22 to pass through perforations 54 of layer 44. For example, if layer 44 comprises leather, vinyl, or other opaque material, perforations 54 may be utilized to permit light to pass through layer 44.

Figures 10, 11, 12, 13:
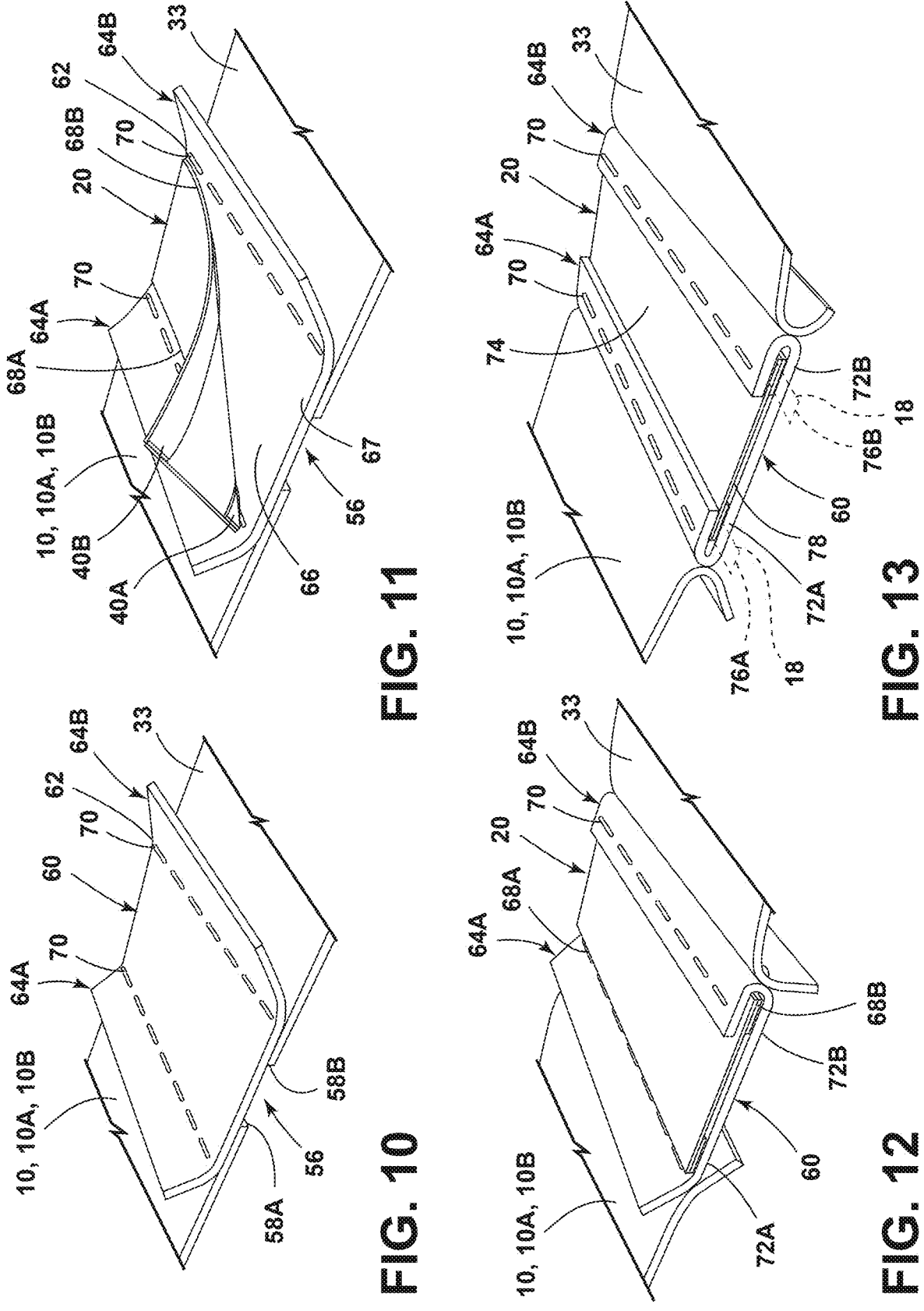
FIG. 10 is a partially fragmentary perspective view showing assembly of a light according to an aspect of the present disclosure.
FIG. 11 is a partially fragmentary perspective view showing assembly of a light according to an aspect of the present disclosure.
FIG. 12 is a partially fragmentary perspective view showing assembly of a light according to an aspect of the present disclosure.
FIG. 13 is a partially fragmentary perspective view showing assembly of a light according to an aspect of the present disclosure.

The light 20 may be secured to a flexible cover 10A or 10B as shown in FIGS. 10-13. As shown in FIG. 10, an opening in the form of an elongated gap or slot 56 may be formed between edges 58A and 58B of cover 10A, 10B. In general, the gap or slot 56 may be formed by cutting the material to form edges 58A and 58B. Alternatively, or the cover 10A, 10B may comprise two separate pieces of material that are brought adjacent to one another to form a gap or slot 56. Gap 56 may have virtually any shape and size as required, and the present disclosure is not limited to an elongated slot.

The material 60 is positioned over the slot 56, and secured to the cover 10A by stitches 62, leaving flaps 64A and 64B. Stitches 62 may comprise thread or other suitable material 60 that may comprise vinyl, fabric, leather, or other suitable material, and material 60 may comprise material that is similar to the material of cover 10A, or the material 60 may comprise material that is significantly different (e.g. different color, different texture, etc.). In the illustrated example, material 60 is in the form of an elongated strip. However, material 60 may have virtually any size and shape.

With further reference to FIG. 11, a light 20 may then be positioned over a central portion 66 of the material 60, with opposite edges 68A and 68B of light 20 positioned adjacent stitching 62. The light 20 may comprise a light 20A (FIG. 8) or a light 20B (FIG. 9), and may include conductive electrical buses 40A and 40B that may be positioned against upper surface 67 of material 60.

With further reference to FIGS. 12 and 13, flaps 64A and 64B may be wrapped around edges 68A and 68B, respectively, of light 20, and stitches 70 may be stitched in place to retain the flaps 64A and 64B in the final positions of FIG. 13. In general, stitches 70 may extend through flaps 64A, 64B, through the light 20, and through the outer portions 72A and 72B of material 60. As shown in FIG. 13, a central portion 74 of light 20 is not covered by material 60, such that light emitted by the light 20 is readily visible from the outer side of cover 10A or 10B. Portions 76A and 76B of conductive buses 40A and 40B, respectively, may optionally project outwardly and/or downwardly beyond the end 78 of light 20 to provide for electrical connection to electrical conductors 18.

Figures 14, 15, 16:
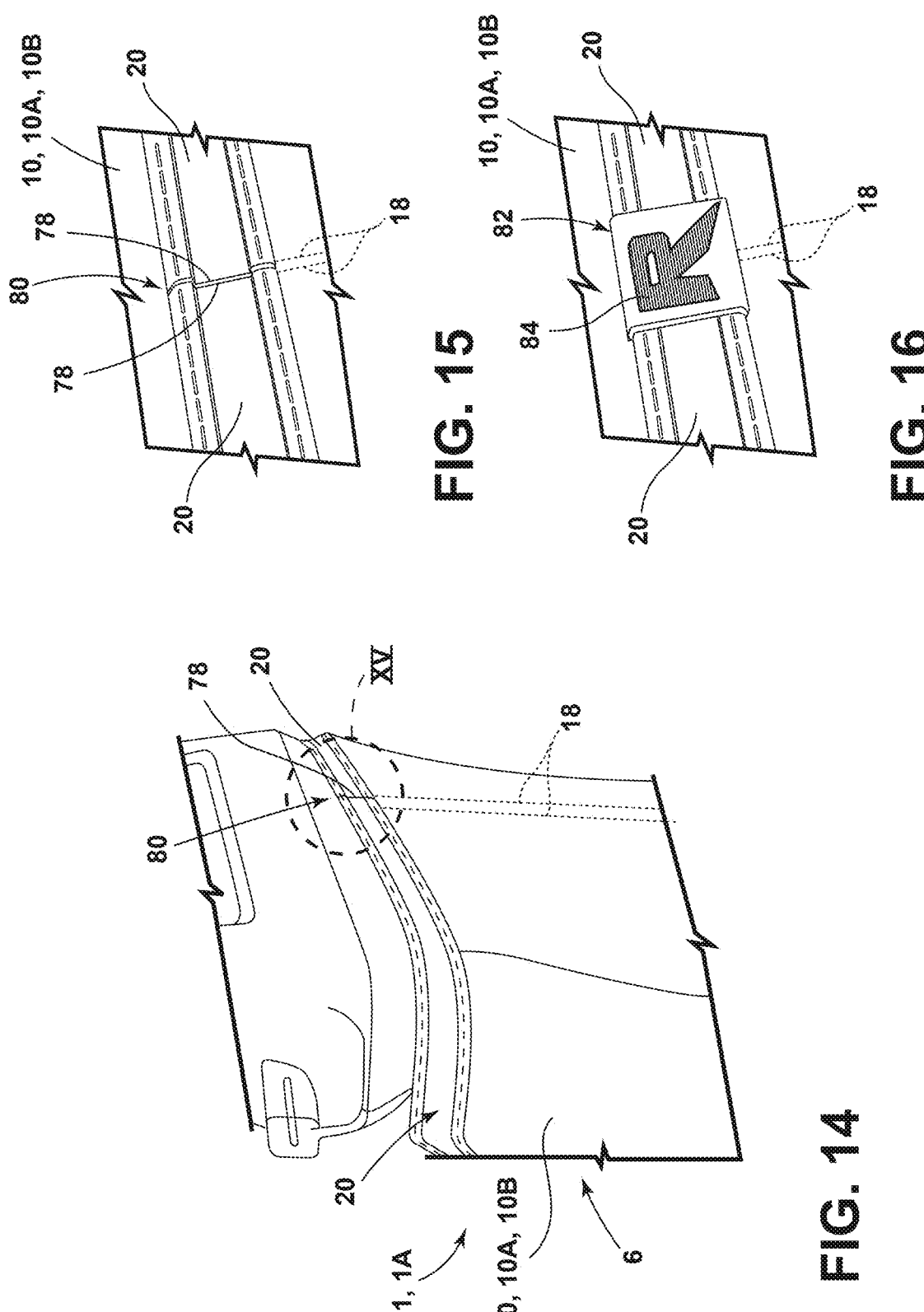
FIG. 14 is a partially fragmentary perspective view of a user support during assembly.
FIG. 15 is an enlarged view of a portion of the user support of FIG. 14.
FIG. 16 is an enlarged view of a portion of the user support of FIG. 14.

With further reference to FIGS. 14-15, two lights 20 may be positioned on a cover 10 (e.g. cover 10A or 10B) of back portion 6 of user support 1, 1A with ends 78 of the adjacent lights 20 positioned directly adjacent each other at a seam 80. The buses 40A, 40B of lights 20 may be electrically connected to electrical conductors 18 (e.g. portions 76A, 76B, FIG. 13) utilizing solder, electrical crimp connectors, or other suitable arrangement. Conductors 18 may comprise first and second conductors having opposite plurality, and each conductor 18 may be connected to the buses 40A, 40B of light 20. Alternatively, four conductors 18 may be utilized, whereby two conductors 18 are operatively connected to a first light 20, and a second pair of conductors 18 are attached to the other light 20.

With further reference to FIG. 16, a piece of flexible material 82 may be positioned over the seam 80, and secured to the cover 10B utilizing stitching, adhesive, or other suitable arrangement. For example, a piece of material 82 may comprise flexible leather, vinyl, cloth, or other suitable material, and a design such as letter 84 may be embroidered on the piece of material 82 to provide a decorative appearance. It will be understood that light 20 may have virtually any size or shape, and may be located at any suitable location on a user support.

Figure 17:
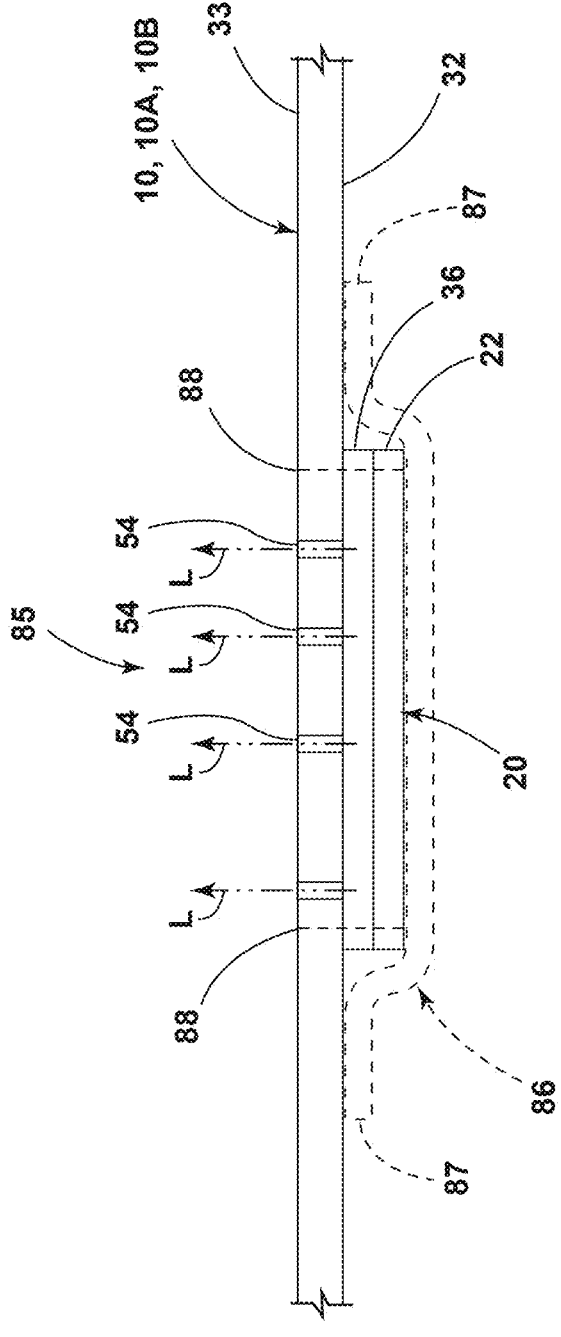
FIG. 17 is a partially schematic view of a light arrangement according to another aspect of the present disclosure.

With further reference to FIG. 17, a light assembly 85 according to another aspect of disclosure comprises a light 20 positioned on an interior side of cover 10A, 10B, whereby light L emitted by light 20 passes through perforations 54 in the material of cover 10A, 10B. Light 20 may comprise electroluminescent material 22 and a layer 36. Layer 36 may comprise TPO or other suitable material as discussed in more detail above. The light 20 may be secured to an inner surface of a cover 10 (e.g. covers 10A, 10B) by adhesive, heat sealing, or other suitable process. An optional cover 86 may extend over the rear side of light 20. Edge portions 87 of cover 86 may be secured to inner surface 32 of cover 10 by heat sealing, adhesive, or stitching. The light 20 may optionally be secured to the cover 10A, 10B utilizing stitches 88.

The light 20 (FIG. 17) of light assembly 85 is positioned adjacent (behind) openings or perforations 54 through the material of cover 10A, 10B, whereby light L produced by light 20 passes through openings 54, such that the light 20 of the light assembly 85 may be positioned at virtually any location on cover 10A, 10B of a user support.

Figure 18:
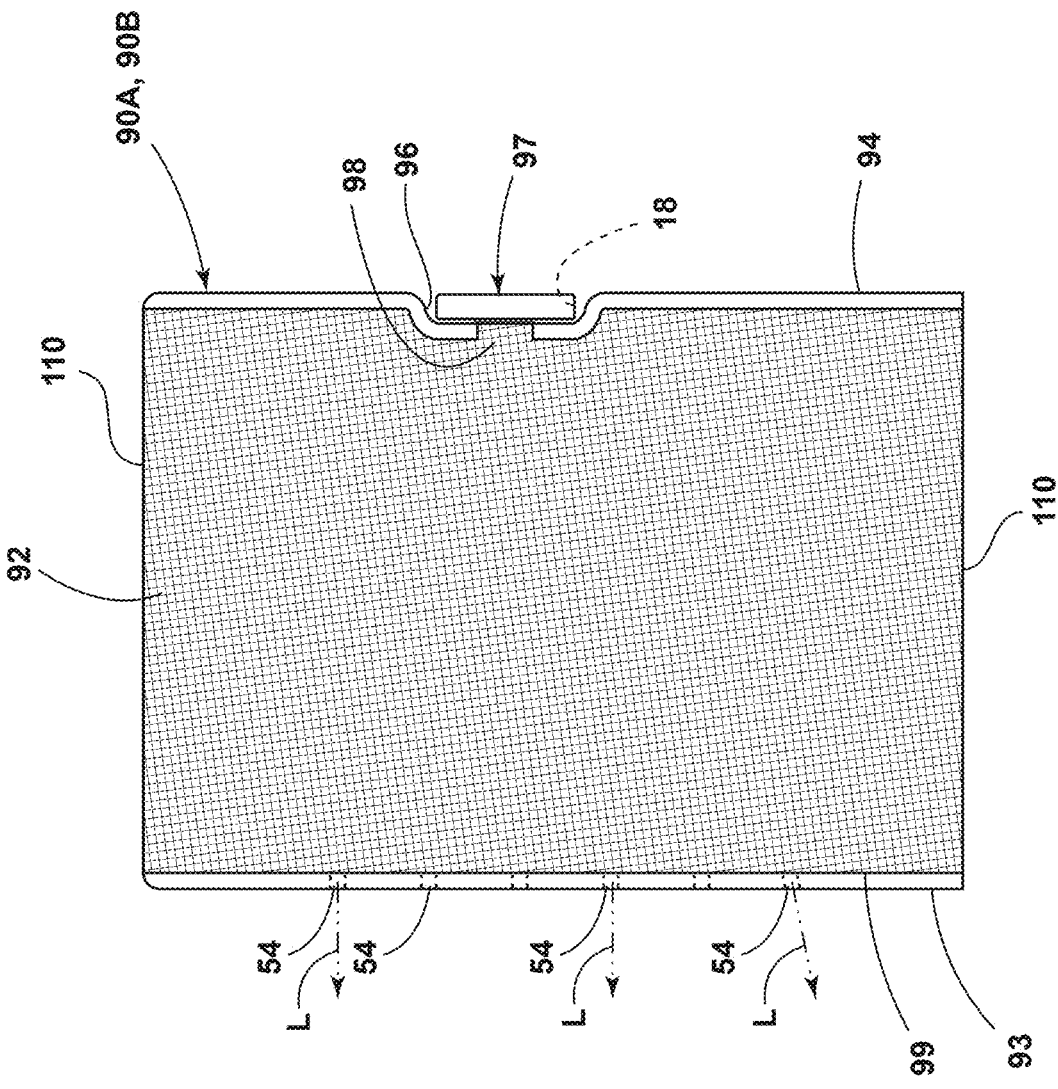
FIG. 18 is a cross section of the user support of FIG. 3 taken along the line XVII-XVII.

With further reference to FIG. 18, the cushions 90A, 90B of user support 64 (FIG. 3) may comprise a resilient porous lattice 92 that is formed utilizing an additive process (3D printing), and may include integrally formed front and rear layers 93 and 94, respectively. The lattice 92 and layers 93 and 94 may comprise polymer or other suitable material, and front layer 32 may be resilient to provide a desired degree of cushioning. Rear layer 94 may include an opening 98 in a recess 96. An LED light source 97 may be positioned in recess 96 to project light "L" through matrix 92 and through optional perforations 54 in front layer 93. The LED light source 97 may be aligned with opening 98 in rear layer 94 to permit the light to pass through rear layer 94. The front layer 93 may include perforations 54 to allow light to pass through layer 93. Alternatively, the cushions 90A, 90B may be formed without front layer 93, such that a front surface 99 of porous lattice is exposed whereby light L escapes through the front surface 99 of porous lattice 92. LED 97 may be operably connected to a power source by conductors 18.

Figures 19, 20, 21, 22:
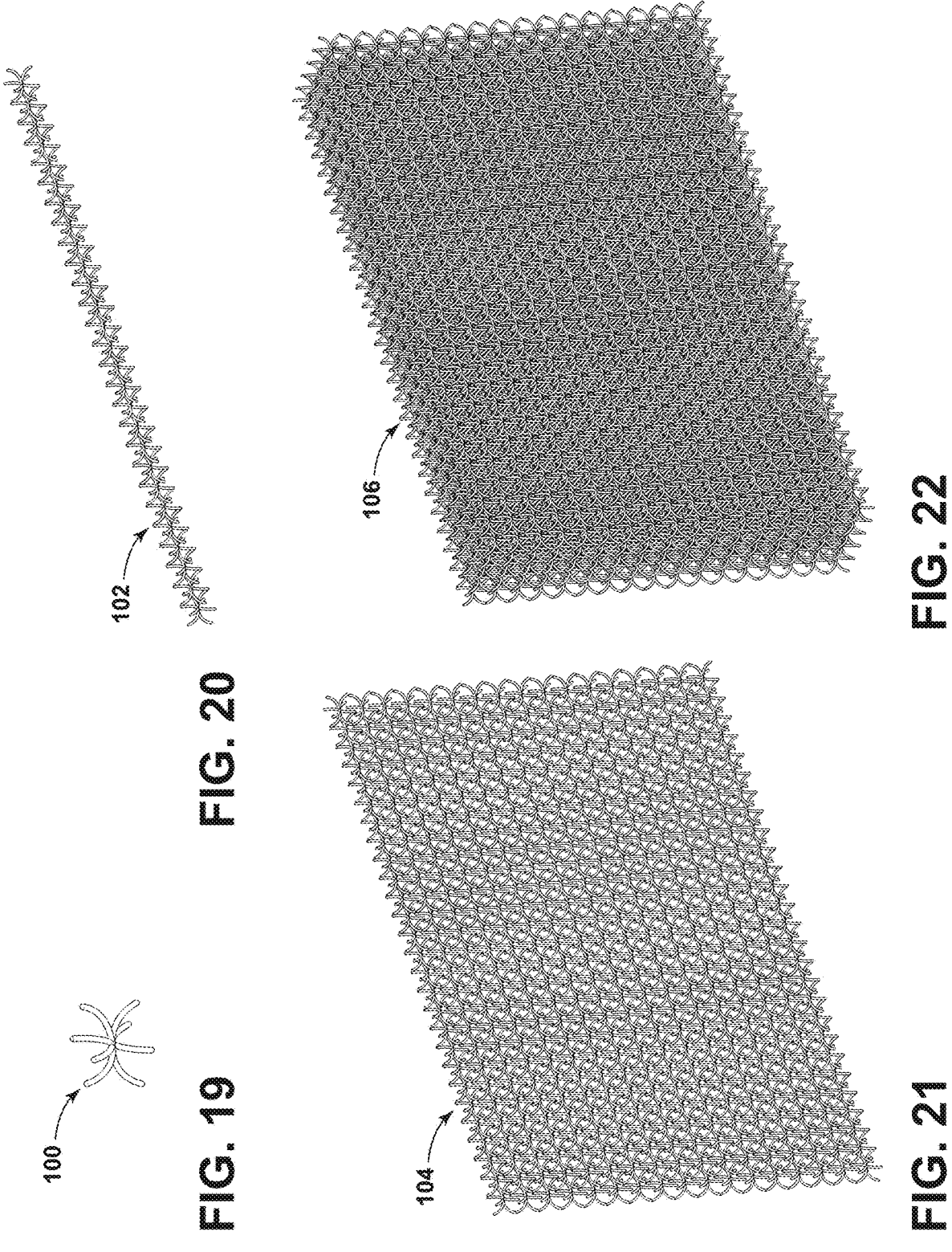
FIG. 19 is a perspective view of a single lattice element.
FIG. 20 is a perspective view of a first step of an array setup.
FIG. 21 is a perspective view of a second step of an array setup.
FIG. 22 is a perspective view of a third step of an array setup.
Figures 23, 24:
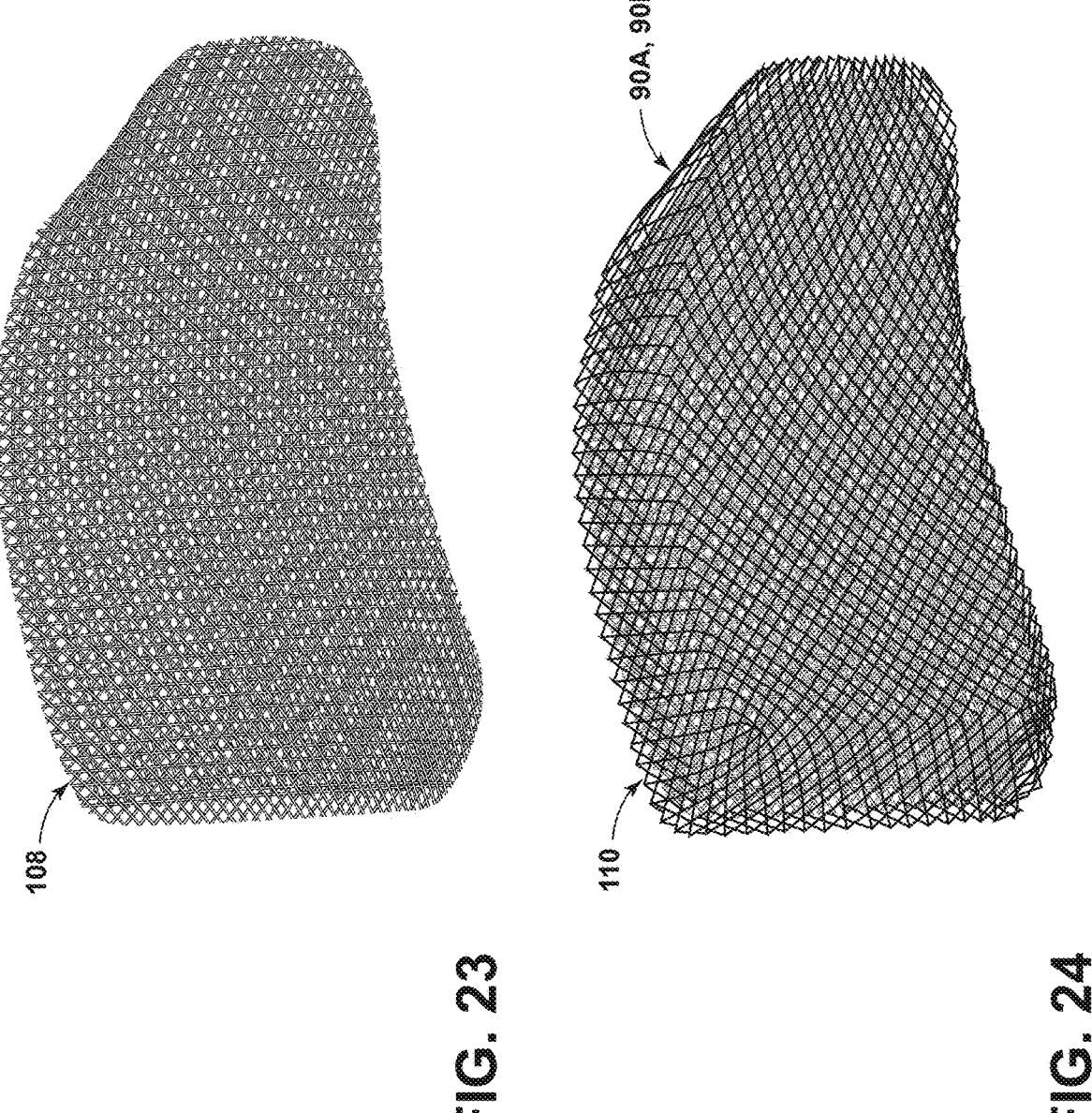
FIG. 23 is a perspective view showing a conformal setup of an array.
FIG. 24 is a perspective view showing a cross hatch porous outer shell.

FIGS. 19-24 show formation of upper cushions 90A, 90B utilizing a 3D additive process. A single structural cell or element 100 (FIG. 19) may be formed initially, and an array 102 (FIG. 20) of interconnected elements (links) may then be formed, followed by a two-dimensional array or layer 104 (FIG. 21). Additional layers of elements 100 may be added to form an array 106 (FIG. 22). A conformal setup may be then be utilized to form a three-dimensional porous lattice matrix such as array 108 (FIG. 23). A cross hatch outer shell 110 may then be formed (FIG. 24). The outer shell 110 is preferably porous, and extends around cushions 90A and 90B (see also FIGS. 3, 4 and 18). It will be understood that cushions having a wide range of shapes and sizes may be formed utilizing the process described herein, and the present disclosure is not limited to the specific cushions 90A and 90B. Array 108 may comprise a one-piece homogeneous polymer structure.

Figures 25A, 25B, 25C, 25D, 26, 27:
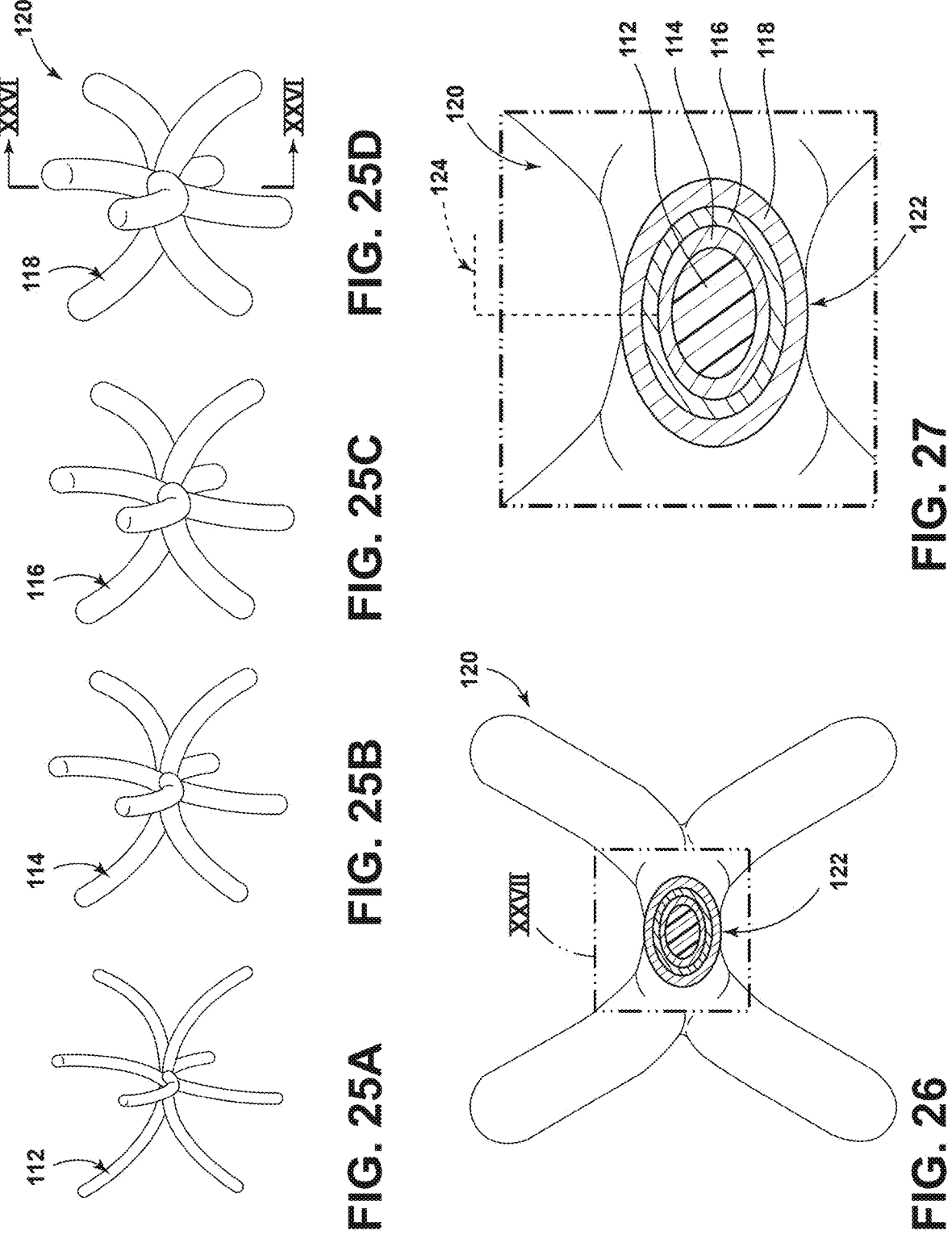
FIG. 25A is a perspective view of a single lattice element showing a base layer or structure.
FIG. 25B is a perspective view of the lattice element of FIG. 25 after a second layer is formed.
FIG. 25C is a perspective view of the lattice element of FIG. 25 after a third layer is formed.
FIG. 25D is a perspective view of the lattice element of FIG. 25 after a fourth layer is formed.
FIG. 26 is a cross sectional view of the lattice element of FIG. 25D taken along the line XXVI-XXVI.
FIG. 27 is an enlarged view of the lattice element of FIG. 26.

With further reference to FIGS. 25A-25D, one or more of the lattice elements (links) may include an outer layer of electroluminescent material whereby the individual lattice elements (links) emit light when electrical power is supplied thereto. With reference to FIG. 25A, a base layer or structure 112 of a porous lattice matrix (e.g. array 108) may be formed from a suitable polymer material such as TPU utilizing an additive process. A backing layer 114 (FIG. 25B) is then applied over the TPU base structure 112. A dielectric layer 116 (FIG. 25C) is then applied over the backing layer 114, and an electroluminescent layer 118 (FIG. 25D) is then applied to form a layer or structure 120 that emits light when electrical power is supplied to the structure 120. The layers 114, 116, and 118 may comprise commercially available LUMILOR® material that is applied utilizing a spraying process, a dipping process, or a 3D additive (printing) process.

With further reference to FIGS. 26 and 27, a cross section 122 of structure 120 includes the base TPU structure 112, backing layer 114, dielectric layer 116, and electroluminescent outer layer 118. One or more electrically conductive elements 124 may be operably interconnected to one or more of the layers 114, 116, 118 to supply electrical power whereby the electroluminescent outer layer 118 emits light.

In general, one or more individual lattice elements of cushions 90A, 90B may include lattice elements 120 that emit light when electrical power is supplied thereto. It will be understood that selected ones of the individual lattice elements may be electrically connected to a power source in a manner that permits only selected ones of the lattice elements to illuminate, whereby illuminated patterns can be formed. Also, the lattice of cushions 90A, 90B may include only some portions that have electroluminescent materials, whereby only some portions of the porous lattice 92 can be illuminated.

Figure 29:
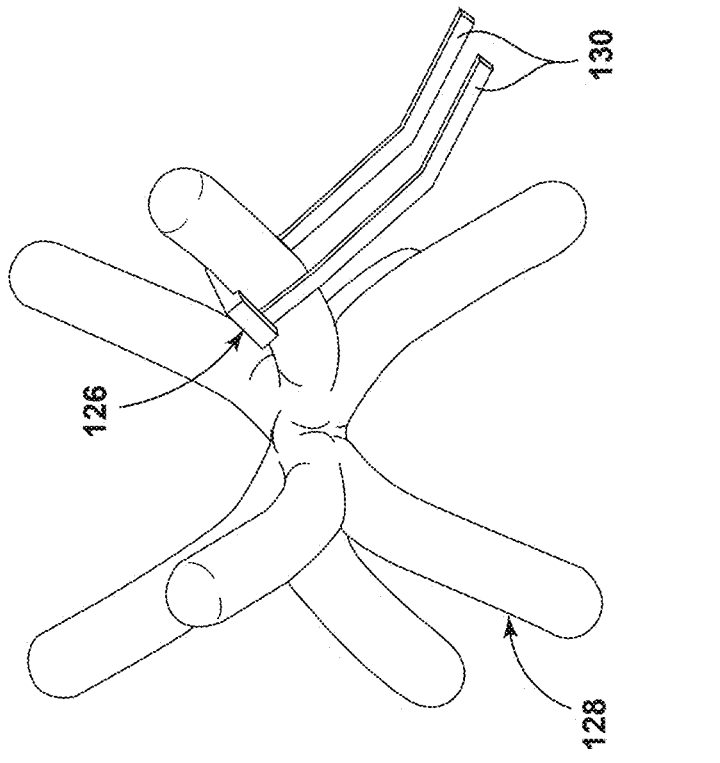
FIG. 29 is a partially schematic view of the lattice element of FIG. 29 having an LED attached to the lattice element.

With further reference to FIGS. 20 and 29, one or more LEDs 126 may be bonded or otherwise attached to one or more lattice elements 128. LED 126 includes conductors 130 that may be operably connected to a power source to thereby cause LED 126 to emit light. LEDs 126 may be positioned in porous lattice 92 of cushions 90A and 90B (FIG. 18) to provide light in addition to LED 97, or instead of LED 97. The lattice element 128 may optionally comprise an illuminated layer or structure 120 (FIGS. 26 and 27), or the lattice element 128 may comprise a polymer material that does not include an outer electroluminescent material 118.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A user support for motor vehicles, the user support comprising:

a lower portion having an upwardly-facing cushioned user support surface;

a back portion having a forwardly-facing user support surface;

a flexible cover extending over at least a portion of a selected one of the lower portion and the back portion;

electrical conductors disposed on an inner side of the flexible cover;

the flexible cover including a flexible light extending along a portion of the flexible cover;

the flexible light including flexible electroluminescent material that is electrically connected to the electrical conductors, wherein the electroluminescent material is configured to emit light when electrical power is supplied to the electroluminescent material by the electrical conductors, wherein the flexible light includes a layer of flexible opaque material, and wherein at least a portion of the layer of flexible opaque material is disposed on an inner side of the flexible electroluminescent material.

2. The user support of claim 1, wherein:

the layer of flexible opaque material and the flexible electroluminescent material comprise elongated flexible strips, wherein the elongated flexible strip of opaque material is wider than the elongated flexible strip of electroluminescent material;

opposite edge portions of the elongated flexible strip of opaque material extend around opposite edges of the elongated flexible strip of electroluminescent material, whereby the opposite edge portions of the elongated flexible strip of opaque material are disposed on an outer side of the elongated flexible strip of electroluminescent material, and a central portion of the elongated flexible strip of opaque material is disposed on an inner side of the elongated flexible strip of electroluminescent material.

3. The user support of claim 2, including:
stitching extending through the opposite edge portions of the elongated flexible strip of opaque material and through the elongated flexible strip of electroluminescent material to thereby interconnect the elongated flexible strip of electroluminescent material to the opposite edge portions of the flexible strip of opaque material.

4. The user support of claim 3, wherein:
the flexible cover comprises flexible opaque material having an elongated opening therethrough with spaced apart edges extending along opposite sides of the elongated opening.

5. The user support of claim 4, wherein:
the elongated flexible strip of opaque material is connected to the elongated flexible strip of opaque material of the flexible cover by stitching extending through the elongated flexible strip of opaque material and through the elongated flexible opaque material of the flexible cover adjacent to the spaced apart edges of the flexible opaque material of the flexible cover.

6. The user support of claim 1, wherein:
the electrical conductors comprise metal printed on an inner side of the flexible cover.

7. The user support of claim 1, including:
a porous lattice matrix formed by an additive process, the porous lattice matrix having a plurality of links that are interconnected to form a one-piece polymer structure.

8. The user support of claim 7, wherein:
at least a selected one of the links includes an electroluminescent material that emits light when electrical power is supplied to the electroluminescent material.

9. The user support of claim 8, wherein:
at least one link of the porous lattice matrix comprises an elongated polymer core that is coated with an electroluminescent material.

10. The user support of claim 9, wherein:
the links of the resilient porous lattice matrix are coated with an electroluminescent material.

11. The user support of claim 7, including:
at least one light emitting diode (LED) secured to a link of the porous lattice matrix.

12. The user support of claim 7, wherein:
the porous lattice matrix has a resilient front surface that is configured to support a user, and a rear surface comprising a layer of material that is integrally formed with the porous lattice matrix, wherein the layer of material includes an opening therethrough; and including:
a light emitting diode (LED) aligned with the opening whereby light emitted by the LED passes through the opening and into the porous lattice matrix.

13. A user support for motor vehicles, the user support comprising:
a frame;
a porous lattice matrix formed by an additive process, the porous lattice matrix having a plurality of links that are interconnected to form a one-piece polymer structure; and wherein:
at least a selected one of the links includes an electroluminescent material that emits light when electrical power is supplied to the electroluminescent material.

14. The user support of claim 13, wherein:
at least one link of the porous lattice matrix comprises an elongated polymer core that is coated with an electroluminescent material.

15. The user support of claim 13, wherein:
the links of the porous lattice matrix are coated with an electroluminescent material.

16. The user support of claim 15, wherein:
at least one light emitting diode (LED) secured to a link of the porous lattice matrix.

17. A user support for motor vehicles, the user support comprising:
a frame;
a porous lattice matrix formed by an additive process, the porous lattice matrix having a plurality of links that are interconnected to form a one-piece polymer structure; and:
at least one light emitting diode (LED) secured to a link of the porous lattice matrix.

18. The user support of claim 17, including:
a plurality of light emitting diodes (LEDs) secured to the porous lattice matrix.

19. The user support of claim 17, wherein:
at least a selected one of the links includes an electroluminescent material that emits light when electrical power is supplied to the electroluminescent material.

\* \* \* \* \*